J. H. CARR.
PLATFORM WHEEL.
APPLICATION FILED MAY 26, 1913.
1,139,160.
Patented May 11, 1915.
2 SHEETS—SHEET 2.
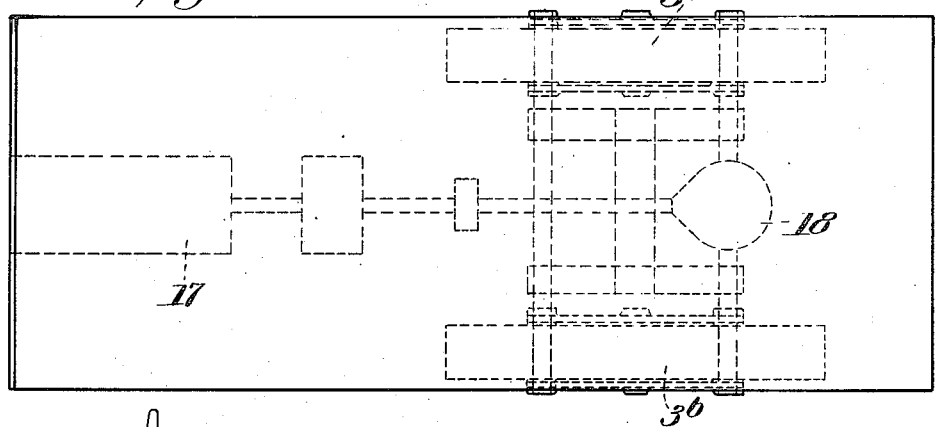
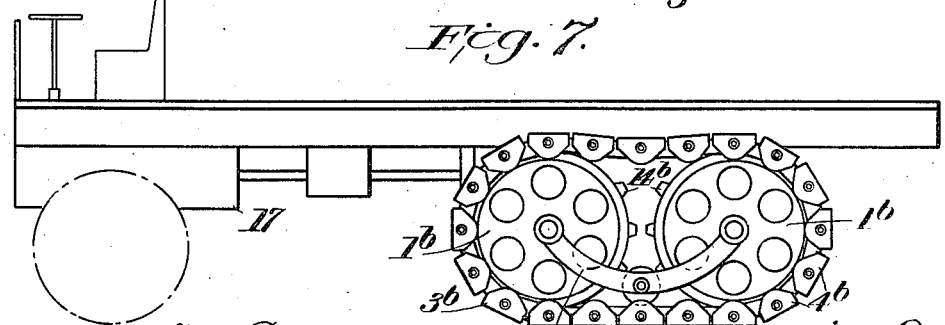
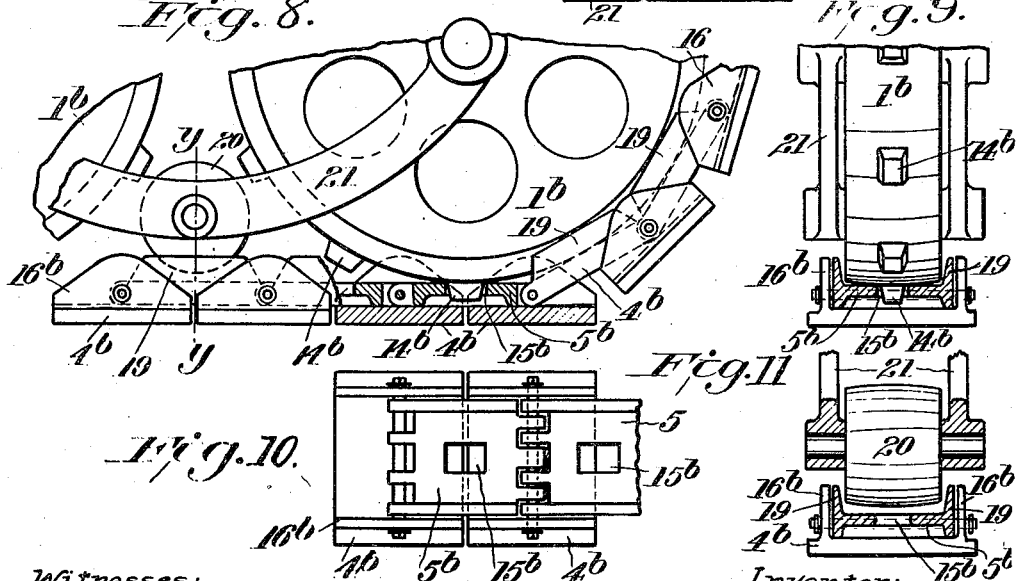
Witnesses:
C. N. Walker
E. Williams
Inventor:
John H. Carr.
By Chas. E. Riordon
Attorney

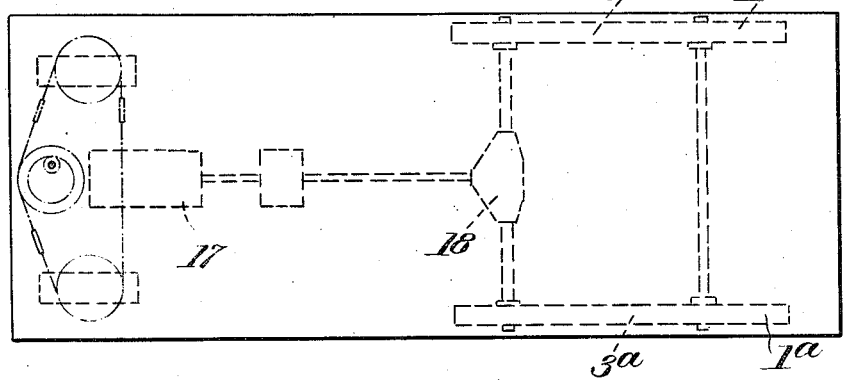

UNITED STATES PATENT OFFICE.

JOHN H. CARR, OF ALHAMBRA, CALIFORNIA.

PLATFORM-WHEEL.

1,139,160.  Specification of Letters Patent. Patented May 11, 1915.

Application filed May 26, 1913. Serial No. 769,912.

*To all whom it may concern:*

Be it known that I, JOHN H. CARR, a citizen of the United States, residing at Alhambra, in the county of Los Angeles and State of California, have invented certain new and useful Improvements in Platform-Wheels, of which the following is a full, clear, and exact specification.

This invention relates to platform wheels, that is wheels for wagons, traction engines and other vehicles employing endless flexible platforms or tracks on which the wheels proper move and which progress with the wheels.

One object of the present invention is to generally simplify and lighten the construction of such wheels as heretofore made.

Another object is to provide a wheel of the character described which may be used on self-propelled vehicles and be driven through the endless flexible track or platform, and may also be employed where the wheel simply supports the load and is carried along with a vehicle which is drawn or driven through some other agency than the wheel itself.

A further object is to materially increase the extent of the bearing surface of the platform or track on the road.

Other objects will become apparent as the description proceeds.

The invention will be first hereinafter described in connection with the accompanying drawings, which constitute a part of this specification, and then more particularly set forth in the claims at the end of the description.

In the accompanying drawings, in which similar reference characters are used throughout the several views to indicate corresponding parts; Figure 1 is a plan view of the body of a self-propelled vehicle with the wheels and driving mechanism therefor being shown diagrammatically in broken lines; Fig. 2 is a side elevation of the structure indicated in Fig. 6; Fig. 3 is an enlarged broken side elevation of one of the wheels and a portion of its track as illustrated in Figs. 1 and 2, the track being shown partly in central section; Fig. 4 is an edge view of the wheel as illustrated in Fig. 3, the track being shown in transverse section, as on the line $x$—$x$ of Fig. 5; Fig. 5 is an inner plan view of a part of this track; Fig. 6 is a view similar to Fig. 1 of a modified construction; Fig. 7 is a side elevation of this last mentioned modification; Fig. 8 is an enlarged broken side elevation of a pair of the wheels of this modification and a portion of their track, a part of the latter being shown in central section; Fig. 9 is an edge view of the wheel as illustrated in Fig. 8, the track being shown in transverse section; Fig. 10 is an inner plan view of a part of this track, and Fig. 11 is a section on the line $y$—$y$ of Fig. 8.

Referring first to Figs. 1 to 5, inclusive, $1^a$ designates a platform wheel especially adapted for being driven through the medium of the endless platform or track $3^a$ which in this instance is passed over the sprocket 13 of the driving mechanism, diagrammatically shown. Flange idlers $13^a$ and $13^b$ may be placed slightly to the rear and above and below the sprocket 13, respectively, in order to hold the endless track to a curve of sufficient radius to insure easy passage around said sprocket which is usually much smaller than the wheel $1^a$. The wheel $1^a$ is equipped with strong sprocket teeth or cogs 14, which like the teeth of the sprocket 13 are designed to engage slots 15 in links $5^a$ connecting the shoes $4^a$. These shoes are preferably formed with tongue and groove ends and are hinged together by the same pins or bolts $6^a$, which pivotally connect said links to the shoes. The wheel may be slightly crown shaped, as clearly shown in Fig. 9, and the shoes may be made with steel casings $8^a$ covering their bases and sides. These casings contain fillings $7^a$ of hard wood or other tough material. The sides of the metal casing extend at the sides of the wheel as at 16, Fig. 4, for the purpose of excluding dirt, &c. The sides of each of the shoes may also be convergent, as illustrated in Fig. 5, whereby they will overlap the sides of the next shoe in succession. The filling $7^a$ is cut away through the center to receive the links which should fit closely at the bottom in order to transmit the load from the wheel to the shoes without throwing any bending stress on the hinge pin $6^a$. In view of the fact that any standard self-driving mechanism may be used, it is deemed unnecessary to illustrate or describe the same in detail. It will be understood, however, that this driving mechanism, which is designated generally by the numeral 17 may include a differential 18 also of standard make, and that the shaft on which the wheels 1ª are secured may be cut in two, so that the difference in speed in turning corners may be taken care of as will be readily understood.

Referring now to Figs. 6 to 11, inclusive, an arrangement is there illustrated whereby the load may be divided equally between two wheels over which a single endless track or platform is passed. The wheels 1ᵇ may be equipped with cogs 14ᵇ to engage slots 15ᵇ in links 5ᵇ connecting shoes 4ᵇ in the same manner as already described in reference to the structure illustrated in Figs. 6 to 10. In this instance, however, the lateral flanges 16ᵇ of the shoes do not overlap, but the links have flanges 19, which bridge the spaces between the ends of said flanges on the shoes. It will be observed that this arrangement of passing the endless track or platform around two wheels greatly increases the extent of the bearing surface of said track or platform on the road. In this form of my invention, the shoes are preferably made flat on the bottom, while in the other two forms, they are made curved endwise so as to bring them more smoothly into engagement with the ground. To prevent the track 3ᵇ from bending in between the wheels, one or more idlers 20 are interposed, as shown clearly in Figs. 7, 8 and 11. These idlers are supported by brackets 21 which are strong enough to sustain the load alone if required by sudden rises or hollows in the road, but normally the idlers are set a little above the lower line of the track, as best shown in Figs. 8 and 9.

Having thus described my invention, what I claim as new and desire to secure by Letters Patent of the United States is:

1. In a structure of the character described, the combination with a rotary member having projections on its periphery, of an endless track loosely surrounding the rotary member and consisting of a series of shoes, links pivotally connecting said shoes together, ends of adjacent links being attached to the middle portions of each shoe by a common pivot, permitting the ends of said shoes to swing free of the links, each of said links having a slot arranged midway between its ends and adapted to be engaged by said projections on the rotary member, said projections being suitably spaced on the rotary member to successively engage the slot in one link after another in rotation.

2. In a structure of the character described, the combination with a rotary member, of an endless track loosely surrounding the rotary member and consisting of a series of shoes connected together by links, each shoe having an outer shell of metal and an inner filling of wood, the metal shells being U-shaped in cross section with their sides adapted to overlap the rim of the rotary member for positioning the track thereon, the wood fillings having longitudinal channels to house the links, and pivot pins passed through the sides of the metal casings and wood fillings of the shoes for connecting said ends of the links together in said channels.

In testimony whereof I have signed my name to this specification in the presence of two attesting witnesses.

JOHN H. CARR.

Witnesses:
CLARENCE V. GRAHAM,
E. L. McLEAN.